United States Patent
Schmandt (10) Patent No.: US 7,490,702 B1
(45) Date of Patent: Feb. 17, 2009

(54) PARKING AND EMERGENCY BRAKE ACTUATOR FOR A DRUM-IN-HAT DISC BRAKE ASSEMBLY

(75) Inventor: Anthony Schmandt, Walled Lake, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 12/004,127

(22) Filed: Dec. 20, 2007

(51) Int. Cl.
*F16D 63/00* (2006.01)

(52) U.S. Cl. .................................. 188/70 R; 188/106 F (58) Field of Classification Search ................. 188/2 D, 188/78, 106 A, 106 P, 196 BA, 196 V, 325–333, 188/70 R, 106 F
See application file for complete search history.

(56) References Cited

U.S. PATENT DOCUMENTS

| | | | | |
|---|---|---|---|---|
| 3,823,799 A | * | 7/1974 | Margetts | ...................... 188/78 |
| 4,702,354 A | * | 10/1987 | Ingram et al. | ............ 188/196 D |
| 4,732,243 A | * | 3/1988 | Ingram et al. | ............ 188/196 D |
| 5,322,145 A | | 6/1994 | Evans | |
| 6,435,317 B2 | * | 8/2002 | Tanaka et al. | ................ 188/2 D |
| 6,729,444 B1 | | 5/2004 | Schmandt et al. | |
| 2006/0144658 A1 | * | 7/2006 | Tessitore et al. | ............ 188/325 |

* cited by examiner

*Primary Examiner*—Christopher P Schwartz
(74) *Attorney, Agent, or Firm*—MacMillan, Sobanski & Todd, LLC (57) ABSTRACT

A drum-in-hat disc brake assembly has a disc service brake and a drum-in-hat parking and emergency brake, and includes a backing plate, a pair of parking and emergency brake shoes secured to the backing plate, and a parking and emergency brake actuator. The parking and emergency brake actuator includes a first body portion and a second body portion pivotally mounted to the first body portion. A boss extends between the first body portion and the second body portion. The boss is selectively movable between a plurality of positions and defines a first distance between the first body portion and the second body portion. A lever arm is pivotally mounted to the second body portion and is connected to a parking and emergency brake cable.

20 Claims, 6 Drawing Sheets

PARKING AND EMERGENCY BRAKE ACTUATOR FOR A DRUM-IN-HAT DISC BRAKE ASSEMBLY

BACKGROUND

Various embodiments of vehicle drum and disc brake assemblies are described herein. In particular, the embodiments described herein relate to an improved structure for a parking brake actuator for use in a vehicle drum-in-hat disc brake assembly.

Most vehicles are equipped with a brake system for slowing or stopping movement of the vehicle in a controlled manner. A typical brake system for an automobile or light truck includes a disc brake assembly for each of the front wheels and either a drum brake assembly or a disc brake assembly for each of the rear wheels. In some instances, the disc brake assembly can be a "drum-in-hat" type of disc brake assembly. The brake assemblies are actuated by hydraulic pressure or pneumatic pressure generated when an operator of the vehicle depresses a brake pedal. The structures of these drum brake assemblies and disc brake assemblies, as well as the actuators therefore, are well known in the art.

A typical drum-in-hat type of disc brake assembly includes a hydraulically or pneumatically actuated disc service brake and a mechanically actuated drum-in-hat parking and emergency brake. The disc service brake includes a rotor which is secured to the wheel of the vehicle for rotation therewith. The rotor includes a pair of opposed friction plates which are selectively engaged by portions of a caliper assembly. The interior of the rotor defines a cylindrical braking surface.

A caliper assembly is slidably supported by pins secured to a mounting flange. The mounting flange is secured to a non-rotatable component of the vehicle, such as the steering knuckle or the axle flange. The caliper assembly includes a pair of brake shoes which are disposed on opposite sides of the rotor. The brake shoes are operatively connected to one or more hydraulically actuated pistons for movement between a non-braking position, wherein they are spaced apart from the opposed friction plates of the rotor, and a braking position, wherein they are moved into frictional engagement with the opposed friction plates of the rotor. When the operator of the vehicle depresses the brake pedal, the piston urges the brake shoes from the non-braking position to the braking position so as to frictionally engage the friction plates of the rotor and thereby slow or stop the rotation of the associated wheel of the vehicle.

The drum-in-hat parking and emergency brake includes a pair of opposed arcuate brake shoes which are supported on a backing plate for selective movement relative thereto. The backing plate is secured to the mounting flange, or alternatively, can be formed integral therewith. Each of the brake shoes has a friction pad or lining secured thereto. The brake shoes extend within the cylindrical braking surface of the rotor. To effect parking and emergency braking action, the operator of the vehicle manually pulls an actuating lever. The lever is connected to an actuation cable having a park brake cable end which, when pulled, actuates a mechanical actuating mechanism. The actuating mechanism is located adjacent one of the ends of the brake shoes and is operative to move the brake shoes outwardly apart from one another such that the friction pads frictionally engage the cylindrical braking surface of the rotor. Such frictional engagement causes slowing or stopping of the rotational movement of the rotor and, therefore, the wheel of the vehicle in a controlled manner.

SUMMARY

The present application describes various embodiments of a vehicle drum-in-hat disc brake assembly. In one embodiment, the drum-in-hat disc brake assembly has a disc service brake and a drum-in-hat parking and emergency brake, and includes a backing plate, a pair of parking and emergency brake shoes secured to the backing plate, and a parking and emergency brake actuator. The parking and emergency brake actuator includes a first body portion and a second body portion pivotally mounted to the first body portion. A boss extends between the first body portion and the second body portion. The boss is selectively movable between a plurality of positions and defines a first distance between the first body portion and the second body portion. A lever arm is pivotally mounted to the second body portion and is connected to a parking and emergency brake cable.

In another embodiment, the drum-in-hat disc brake assembly has a disc service brake and a drum-in-hat parking and emergency brake, and includes a backing plate, a pair of parking and emergency brake shoes secured to the backing plate, and a parking and emergency brake actuator. The parking and emergency brake actuator includes a first body portion and a second body portion pivotally mounted to the first body portion. A lever arm is pivotally mounted to the second body portion and connected to a parking and emergency brake cable. A spring urges the second body portion toward the first body portion.

In another embodiment, the drum-in-hat disc brake assembly has a disc service brake and a drum-in-hat parking and emergency brake, and includes a backing plate, a pair of parking and emergency brake shoes secured to the backing plate, and a parking and emergency brake actuator. The parking and emergency brake actuator includes a first body portion and a second body portion movably mounted to the first body portion. A boss extends between the first body portion and the second body portion. The boss is selectively movable between a plurality of positions and defines a first distance between the first body portion and the second body portion. A lever arm is pivotally mounted to the second body portion and is connected to a parking and emergency brake cable. A spring urges the second body portion toward the first body portion.

Other advantages of the vehicle drum-in-hat disc brake assembly will become apparent to those skilled in the art from the following detailed description, when read in light of the accompanying drawings.

DETAILED DESCRIPTION OF THE INVENTION

Figure 1:
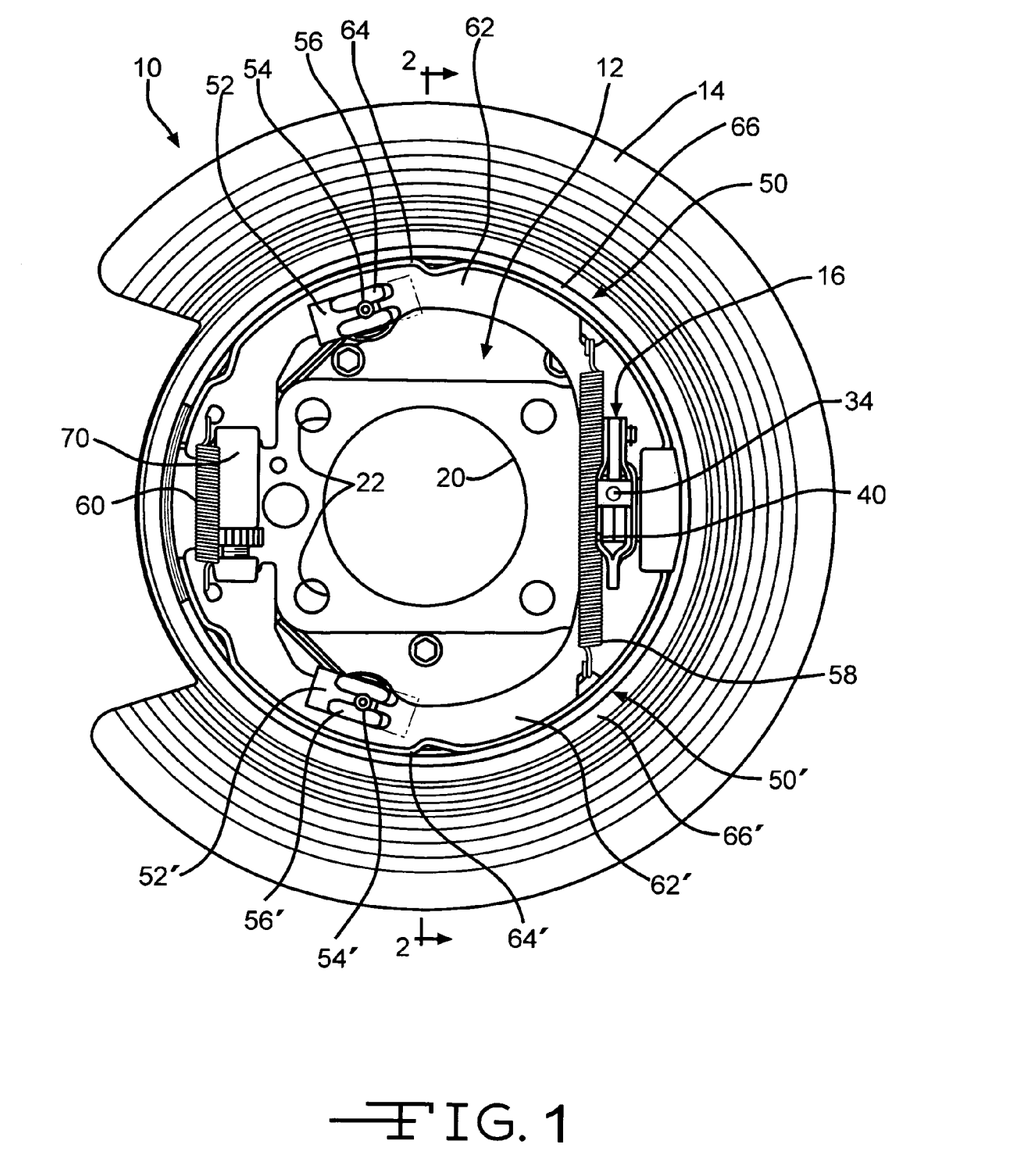
FIG. 1 is an outboard side elevational view of a first embodiment of vehicle drum-in-hat disc brake assembly, and showing the actuator without the spring.
Figure 2:
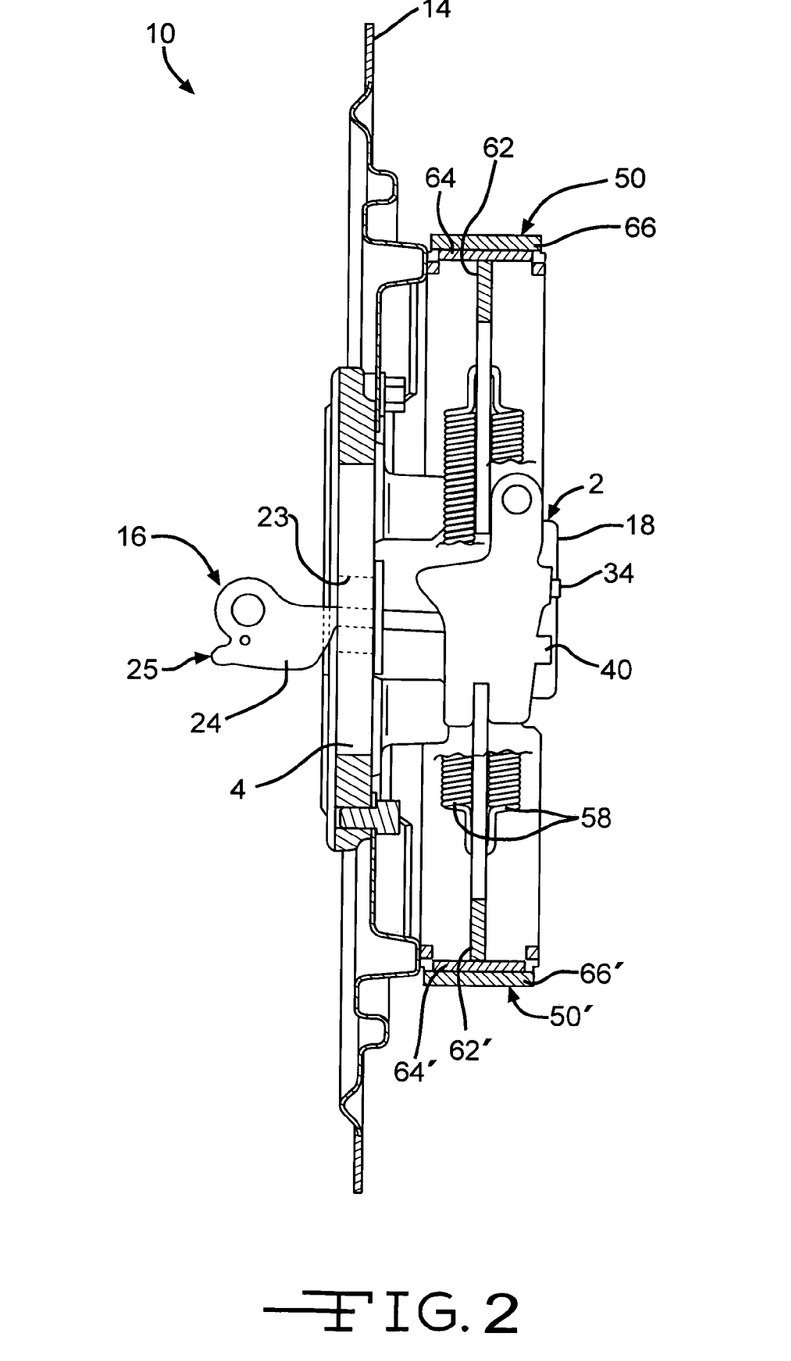
FIG. 2 is a sectional view taken along line 2-2 of FIG. 1, and showing the actuator without the spring.

Referring now to the drawings, there is illustrated in FIGS. 1 and 2 a portion of a first embodiment of a vehicle drum-in-hat disc assembly, indicated generally at 10. The vehicle drum-in-hat disc brake assembly 10 includes a hydraulically or pneumatically actuated disc service brake (not shown), and a drum-in-hat parking and emergency brake. In the illustrated embodiment, the vehicle drum-in-hat parking and emergency brake is a sliding shoe type of brake. The general structure and operation of the vehicle drum-in-hat disc brake assembly is conventional in the art. Thus, only those portions of the vehicle drum-in-hat disc brake assembly which are necessary for a full understanding of this invention will be explained and illustrated in detail. Although this invention will be described and illustrated in connection with the particular vehicle drum-in-hat disc brake assembly 10 disclosed herein, it will be appreciated that this invention may be used in connection with other sliding shoe types, or pivoted shoe types, of drum-in-hat disc brake assemblies in connection with the associated parking and emergency brake portion if so desired.

As shown in FIGS. 1 and 2, the illustrated vehicle drum-in-hat disc brake assembly 10 includes a drum-in-hat adapter assembly 12, a backing plate 14, and a drum-in-hat parking and emergency brake portion, indicated generally at 16 in FIGS. 1 and 2. The adapter assembly 12 includes a drum-in-hat adapter portion 2 and an axle flange portion 4 formed integrally therewith. The adapter assembly 12 is illustrated as being a one-piece casting and is adapted for enclosing a rotatable axle (not shown). To accomplish this, the adapter assembly 12 includes a relatively large opening 20 and a plurality of smaller lug bolt mounting holes 22 formed therein about the opening 20. The opening 20 permits an outer end of an axle to extend therethrough to the vehicle wheel (not shown), and suitable fasteners (not shown), are disposed in the lug bolt mounting holes 22 to secure the adapter assembly 12 to the associated vehicle component.

The adapter assembly 12 further includes an abutment 18. The illustrated abutment 18 is integrally cast with the drum-in-hat adapter assembly 12. Alternatively, other structures than the one-piece drum-in-hat adapter assembly 12 illustrated and described herein can be used. For example, a caliper supporting anchor plate, a mounting flange, and a backing plate such as shown in U.S. Pat. No. 5,322,145 to Evans can be used.

Figure 3:
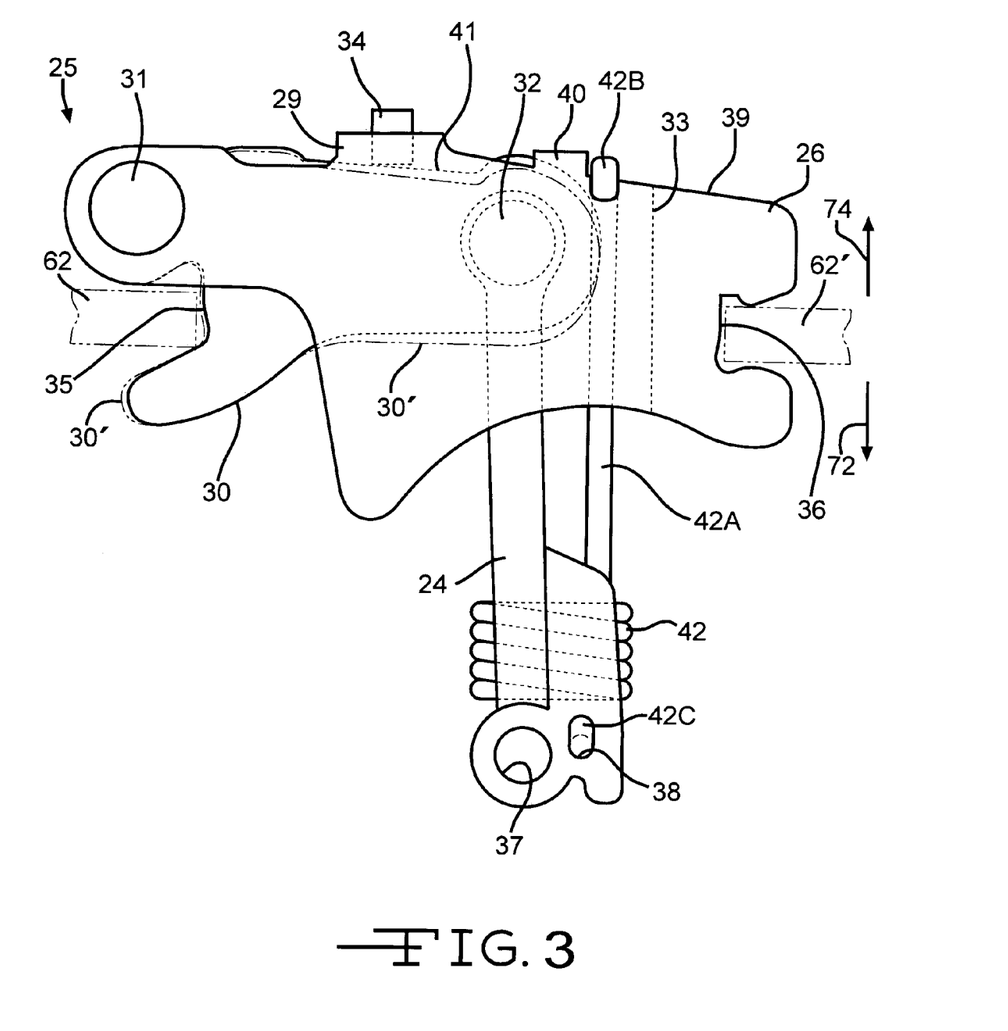
FIG. 3 is an enlarged plan view of the parking and emergency brake actuator illustrated in FIGS. 1 and 2.
Figure 4:
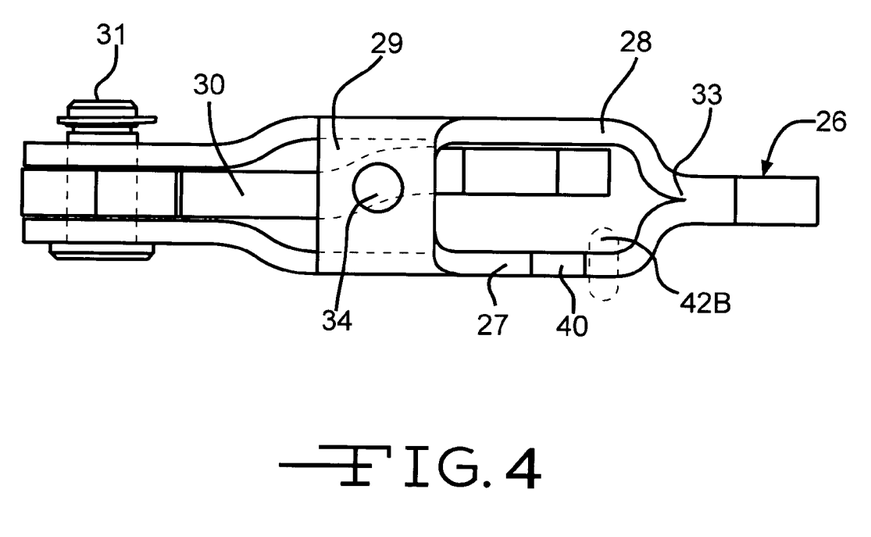
FIG. 4 is an enlarged side view of the parking and emergency brake actuator illustrated in FIG. 3, showing a portion of the spring and showing the actuator without the lever arm.
Figure 5:
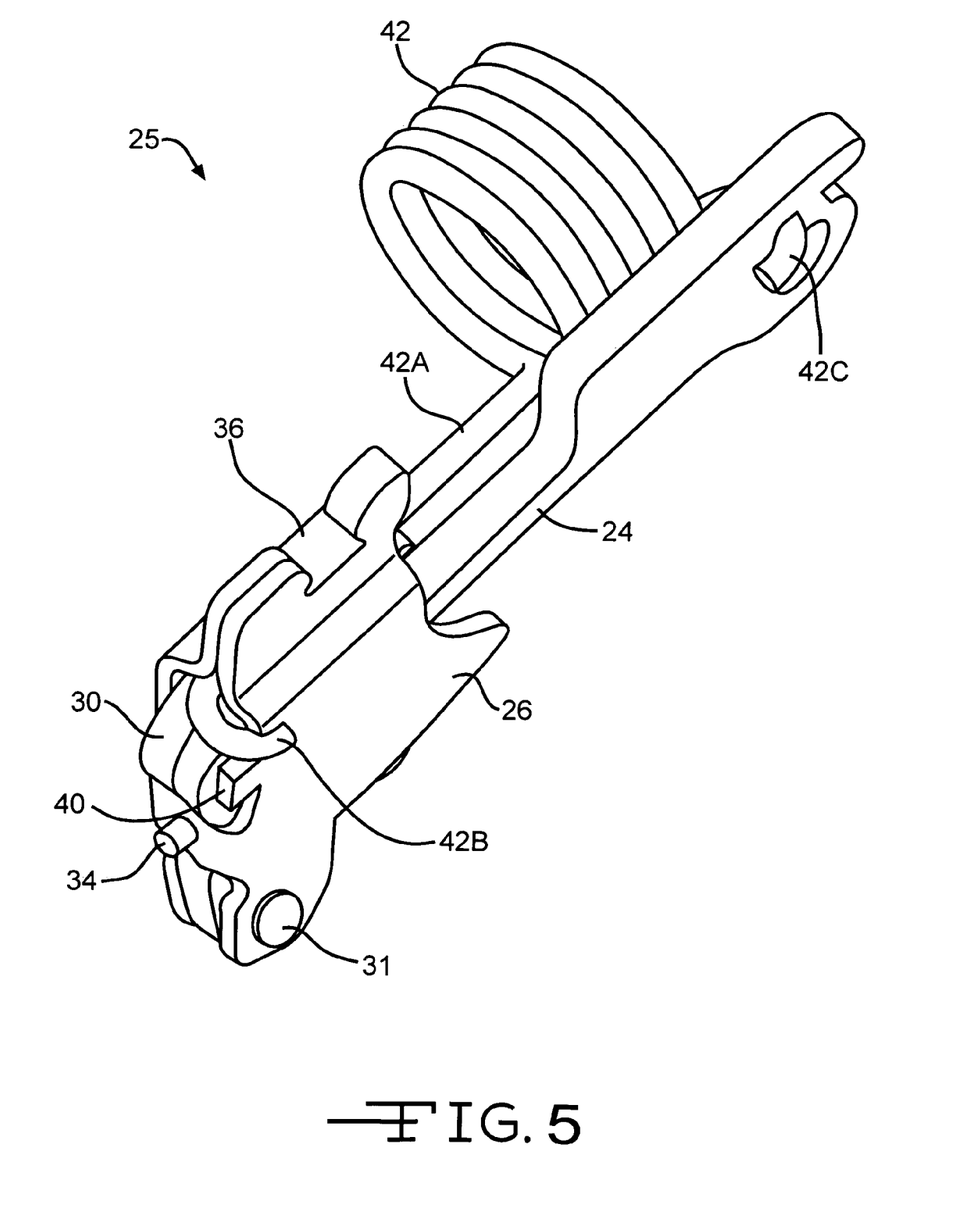
FIG. 5 is an enlarged perspective view of the vehicle drum-in-hat disc brake assembly illustrated in FIG. 1.

The drum-in-hat adapter assembly 12 further includes a generally elongated slotted opening 23, shown in FIG. 2. The slotted opening 23 is adapted to allow a lever arm 24 of a parking brake and emergency brake actuator 25 to extend therethrough. As best shown in FIGS. 3 through 5 inclusive, the actuator 25 includes a first body portion or link assembly 26 having first and second wall portions, 27 and 28 respectively, and a strap portion 29 therebetween. The wall portions 27 and 28 are attached at a seam 33, as best shown in FIGS. 3 and 4. A second body portion or lever 30 is pivotally supported on the link assembly 26 by a first pivot pin 31. The lever arm 24 is pivotally supported on the lever 30 by a second pivot pin 32. A rivet, screw, or boss 34 is extends inwardly (downwardly as viewed in FIG. 3) from the strap portion 29.

The lever 30 and link assembly 26 define a first slot or notch 35 (opening to the left as viewed in FIG. 3), and the link assembly 26 defines a second slot or notch 36 (opening to the right as viewed in FIG. 3); the purpose of both notches 35 and 36 will be described in detail below. The lever arm 24 includes a cable attachment aperture 37 at a distal end thereof. The distal end of the lever arm 24 further includes a spring attachment aperture 38.

An outwardly facing edge surface 39 (upwardly as viewed in FIG. 3) of first wall portion 27 of the link assembly 26 includes a tab 40 for retaining a spring 42. The spring 42 has a leg portion 42A and extends between the edge surface 39 of the first wall portion 27 and the distal end of the lever arm 24. The first end 42B of the spring 42 engages the edge surface 39 adjacent the tab 40. The second end 42C of the spring 42 is disposed in the aperture 38. An inside opening of the lever assembly 26 (defined as the space between the wall portions 27 and 28 and the seam 33) prevents the spring leg portion 42A from rotating and thereby maintains the alignment of the lever arm 24 relative to the lever assembly 26, substantially as shown in FIG. 3.

The illustrated backing plate 14 of the drum-in-hat disc brake assembly 10 is preferably a stamped metal backing plate and includes a relatively large central opening (not shown) and a plurality of smaller openings (not shown) formed therein about the central opening 20 of the drum-in-hat adapter assembly 12. The central opening permits an outer end of the rotatable axle (not shown) to extend therethrough to a wheel (not shown) of the vehicle. The smaller openings are adapted to receive suitable fasteners, such as threaded mounting studs (not shown).

Such studs may extend through the openings formed in the backing plate 14 and the openings 22 drum-in-hat adapter assembly 12, and threaded ends thereof may be threadably received in threaded openings (not shown) provided in the associate vehicle component to secure the backing plate 14 and the drum-in-hat adapter assembly 12, and therefore the drum-in-hat disc brake assembly 10, to the associated vehicle component. Alternatively, the backing plate 14 and/or the drum-in-hat adapter assembly 12 can be secured to one another and/or can be secured to the associated vehicle component by other methods.

The vehicle drum-in-hat disc brake assembly 10 further includes a pair of brake shoes 50 and 50' supported thereon by conventional pivot pin and spring-clip assemblies, indicated generally at 52. Each of the assemblies 52 includes a pin 54 which extends through an opening (not shown) of the backing plate 14 and through associated opening (not shown) provided in the brake shoes 50 and 50'. The pins 54 have outer ends which are adapted to be fastened or secured to clips 56 of the spring-clip assemblies 52 to secure the brake shoes 50 and 50' to the backing plate 14 in a conventional manner. The illustrated drum-in-hat brake assembly 10 also includes a first retraction spring 58 and a second retraction spring 60. The exemplary retraction springs 58 and 60 are illustrated as a pair of retraction springs. It will be understood however, that the only a single retraction spring, such as either the spring 58 or the spring 60 may be provided.

The drum-in-hat parking and emergency brake portion 16 of the brake assembly 10 includes the pair of brake shoes 50 and 50' supported on the backing plate 14. Structurally, the brake shoes 50 and 50' are essentially mirror images of one another, and like reference numbers are used to indicate similar parts. The brake shoes 50 and 50' include respective web portions 62 and 62' which are generally flat and crescent-shaped. Generally arcuate-shaped rim portions 64 and 64' are secured to the opposed outer curved surfaces of the web portions 62 and 62', such as by welding. A friction pad 66 is secured to the outer arcuate surface of the rim portion 64 of the brake pad 50, while a friction pad 66' is secured to the outer arcuate surface of the rim portion 64 of the brake pad 50'. The vehicle drum-in-hat parking and emergency brake 10 further includes a manual adjusting mechanism, indicated generally at 70, to compensate for thinning of the friction pads 66 and 66' resulting from wear caused by repeated use.

As best shown in FIG. 3, the lever arm 24 is pivotally supported on the lever 30 by the second pivot pin 32. In the illustrated embodiment, the second pivot pin 32 is integrally formed with the link assembly 26. Alternatively, the second pivot pin 32 may be an independent component separately assembled to the link assembly 26. The actuator 25 is supported between the upper ends of the web portions 62 and 62' of the brake shoes 50 and 50', respectively. A portion of the web 62 of the brake shoe 50 is received within the first notch 35 to operatively couple the actuator 25 to the brake shoe 50. Similarly, a portion of the web 62' of the brake shoe 50' is received within the second notch 36 to operatively couple the actuator 25 to the brake shoe 50'.

The cable attachment aperture 37 of the lever arm 24 is adapted to receive an attachment member (not shown), such as a known generally S-shaped hook member, which is operatively connected via an actuation cable (not shown) to a manually operated parking and emergency brake actuation device (not shown). Examples of such manually operated parking and emergency brake actuation devices include a driver operated hand lever and/or foot pedal for manually actuating the parking and emergency brake. Alternatively, other known constructions of the actuator 25 may be used.

The drum-in-hat parking and emergency brake portion 16 further may include a seal (not shown) formed from a flexible material. The seal may be disposed in the slotted opening 23 to prevent water, dirt, and other contaminants from entering into the interior of the drum-in-hat disc brake assembly 10 through the slotted opening 23 of the drum-in-hat adapter assembly 12.

The illustrated embodiments show an actuator 25 having both the rivet 34 and the spring 42. Alternatively, the actuator 25 may be manufactured having only one of the illustrated rivet 34 or the spring 42.

In operation, the actuator 25 is movable from an initial position, such as shown in FIG. 3, wherein an outer surface 41 of the lever 30 engages the rivet 34. When the lever arm 24 is actuated (i.e., moved to the left when viewing FIG. 2) via the actuation cable (not shown), the link assembly 26, the lever arm 24, and the lever 30 cooperate to engage and operatively move the brake shoes 50' and 50 outwardly into engagement with an inner cylindrical braking surface (not shown) of a drum-in-hat brake rotor brake in a known manner. Specifically, the second notch 36 of the link assembly 26 engages and moves or expands the brake 50' outwardly (downwardly when viewing FIG. 2) and the first notch 35 defined between the lever 30 and the link assembly 26 engages and moves or expands the brake shoe 50 outwardly (upwardly when viewing FIG. 2). The brakes 50 and 50' are thereby moved to a desired breaking position. When the actuator cable is released, the spring 42 urges the lever arm 24 to its initial position (in the direction of the arrow 74).

In an embodiment without a rivet 34, or when the rivet 34 is at an extreme of travel outward of the link assembly 26 (in the direction of the arrow 74 when viewing FIG. 3), the initial position may be defined as when the outer surface 41 of the lever 30 engages an inner surface of the link assembly 26. The inner surface may be defined as the inner surface (downwardly facing surface when viewing FIG. 3) of the strap 29.

The rivet 34, as best shown in FIG. 3, provides an adjustable device that eliminates dimensional tolerances in the link assembly 26. For example, referring to FIG. 6, the dimension Y, between the rivet 34 and the lever 30, may be adjusted by adjusting or positioning the rivet 34 either inwardly (in the direction of the arrow 72 when viewing FIG. 3) or outwardly (in the direction of the arrow 74 when viewing FIG. 3). In the illustrated embodiment, the solid line 30 illustrates the lever 30 in a first position wherein the rivet 34 does not exert a force on the lever 30. The phantom line 30' illustrates the lever 30 after the rivet 34 has been moved inwardly (in the direction of the arrow 72 when viewing FIG. 3).

Figure 6:
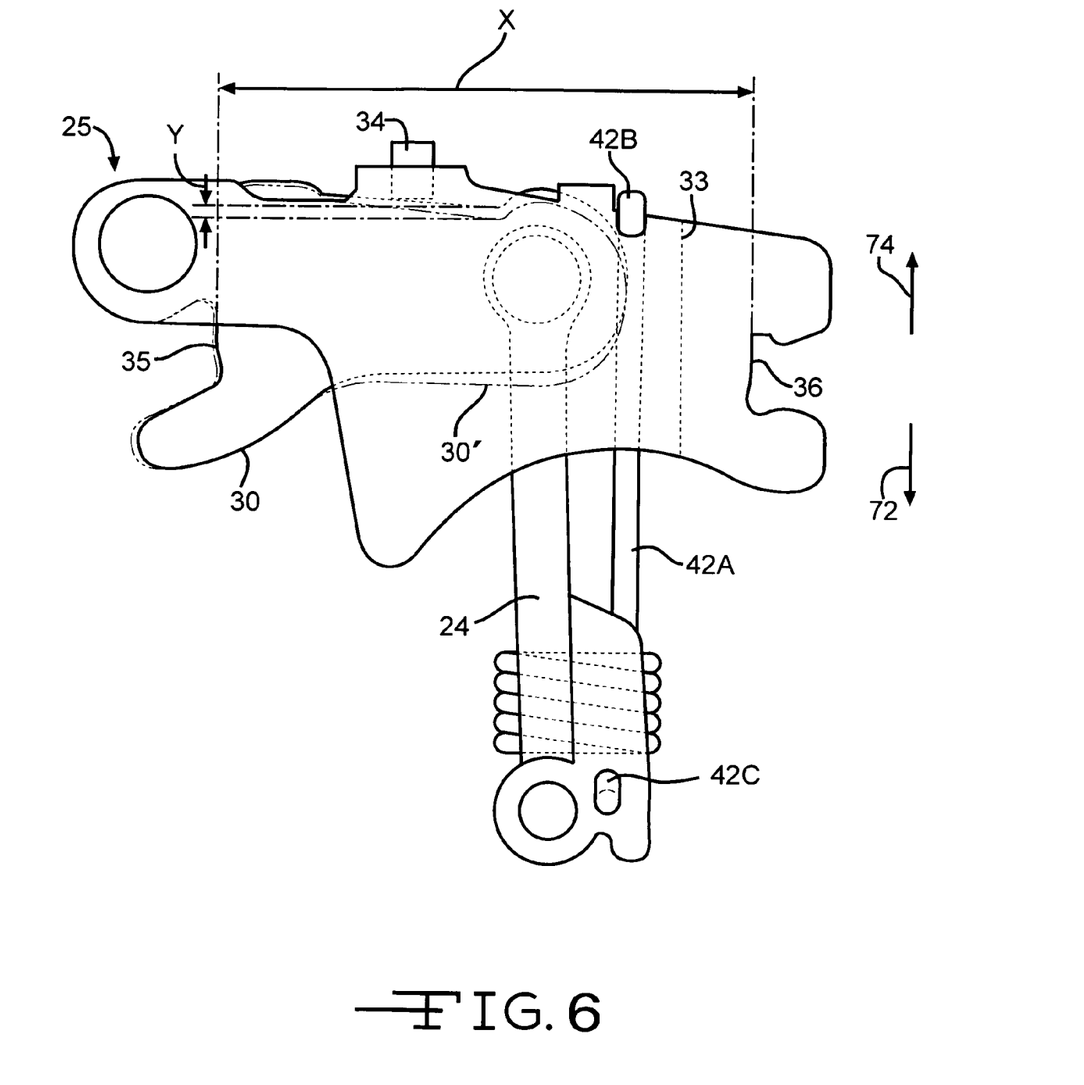
FIG. 6 is an enlarged plan view of the parking and emergency brake actuator illustrated in FIGS. 1 and 2.

Increasing the dimension Y causes the first notch 35 to move away from the second notch 36, thus increasing the dimension X. Adjustment of the dimension X thereby allows the adjustment of clearances and tolerances of the link assembly 26 relative to the DIH parking and emergency brake portion 16 and the DIH brake assembly 10.

The principle and mode of operation of the drum-in-hat disc brake assembly have been described in its various embodiments. However, it should be noted that the drum-in-hat disc brake assembly described herein may be practiced otherwise than as specifically illustrated and described without departing from its scope.

What is claimed is:

1. A drum-in-hat disc brake assembly having a disc service brake and a drum-in-hat parking and emergency brake, the drum-in-hat disc brake assembly comprising:
   a backing plate;
   a pair of parking and emergency brake shoes secured to the backing plate; and
   a parking and emergency brake actuator comprising:
      a first body portion;
      a second body portion pivotally mounted to the first body portion via a first pivot pin;
      a separate boss extending between the first body portion and the second body portion, the boss being fastened to the first body portion and selectively movable between a plurality of positions and defining a first distance between the first body portion and the second body portion; and
      a lever arm pivotally mounted to the second body portion via a second pivot pin and connected to a parking and emergency brake cable.

2. The drum-in-hat disc brake assembly according to claim 1, wherein the boss is a rivet.

3. The drum-in-hat disc brake assembly according to claim 1, wherein the boss is a screw.

4. The drum-in-hat disc brake assembly according to claim 1, wherein the actuator has a first side engaging one of the pair of brake shoes and a second side engaging the other of the pair of brake shoes, a second distance being defined between the first and second sides;
   wherein changing the first distance changes the second distance.

5. The drum-in-hat disc brake assembly according to claim 1, wherein the first body portion of the parking and emergency brake actuator has an inner surface and the second body portion has an outer surface.

6. The drum-in-hat disc brake assembly according to claim 5, wherein the boss extends inwardly from the inner surface of the first body portion toward the outer surface of the second body portion, and wherein the first distance is defined between the inner surface of the first body portion and the outer surface of the second body portion.

7. The drum-in-hat disc brake assembly according to claim 5, wherein movement of the lever arm in a first direction causes the outer surface of the second body portion to move away from the inner surface of the first body portion, and further causes the first distance to increase.

8. The drum-in-hat disc brake assembly according to claim 1, further including a spring operatively disposed between the first body portion and the lever arm.

9. The drum-in-hat disc brake assembly according to claim 8, wherein the spring has a first end and a second end, the first end attached to a distal end of the lever arm, the second end attached to the first body portion.

10. A drum-in-hat disc brake assembly having a disc service brake and a drum-in-hat parking and emergency brake, the drum-in-hat disc brake assembly comprising:
    a backing plate;
    a pair of parking and emergency brake shoes secured to the backing plate; and
    a parking and emergency brake actuator comprising:
        a first body portion;
        a second body portion pivotally mounted to the first body portion;
        a lever arm pivotally mounted to the second body portion and connected to a parking and emergency brake cable; and
        a spring operatively disposed between the first body portion and the lever arm.

11. The drum-in-hat disc brake assembly according to claim 10, wherein the spring has a first end and a second end, the first end attached to a distal end of the lever arm, the second end attached to the first body portion.

12. The drum-in-hat disc brake assembly according to claim 10, further including a boss extending between the first body portion and the second body portion, the boss being selectively movable between a plurality of positions and defining a first distance between the first body portion and the second body portion.

13. The drum-in-hat disc brake assembly according to claim 12, wherein the first body portion of the parking and emergency brake actuator has an inner surface and the second body portion has an outer surface.

14. The drum-in-hat disc brake assembly according to claim 13, wherein the boss extends inwardly from the inner surface of the first body portion toward the outer surface of the second body portion, and wherein the first distance is defined between the inner surface of the first body portion and the outer surface of the second body portion.

15. The drum-in-hat disc brake assembly according to claim 14, wherein the actuator has a first side engaging one of the pair of brake shoes and a second side engaging the other of the pair of brake shoes, a second distance being defined between the first and second sides; wherein changing the first distance changes the second distance.

16. The drum-in-hat disc brake assembly according to claim 13, wherein movement of the lever arm in a first direction causes the outer surface of the second body portion to move away from the inner surface of the first body portion, and further causes the first distance to increase.

17. A drum-in-hat disc brake assembly having a disc service brake and a drum-in-hat parking and emergency brake, the drum-in-hat disc brake assembly comprising:
    a backing plate;
    a pair of parking and emergency brake shoes secured to the backing plate; and
    a parking and emergency brake actuator comprising:
        a first body portion;
        a second body portion movably mounted to the first body portion via a first pivot pin;
        a separate boss extending between the first body portion and the second body portion, the boss being fastened to the first body portion and selectively movable between a plurality of positions and defining a first distance between the first body portion and the second body portion;
        a lever arm pivotally mounted to the second body portion via a second pivot pin and connected to a parking and emergency brake cable; and
        a spring operatively disposed between the first body portion and the lever arm.

18. The drum-in-hat disc brake assembly according to claim 17, wherein the spring has a first end and a second end, the first end attached to a distal end of the lever arm, the second end attached to the first body portion.

19. The drum-in-hat disc brake assembly according to claim 17, wherein the boss is one of a rivet and a screw.

20. The drum-in-hat disc brake assembly according to claim 17, wherein the first body portion of the parking and emergency brake actuator has an inner surface and the second body portion has an outer surface, wherein the boss extends inwardly from the inner surface of the first body portion toward the outer surface of the second body portion, wherein the first distance is defined between the inner surface of the first body portion and the outer surface of the second body portion, wherein the actuator has a first side engaging one of the pair of brake shoes and a second side engaging the other of the pair of brake shoes, a second distance being defined between the first and second sides, and wherein changing the first distance changes the second distance.

* * * * *